Patented Feb. 12, 1929.

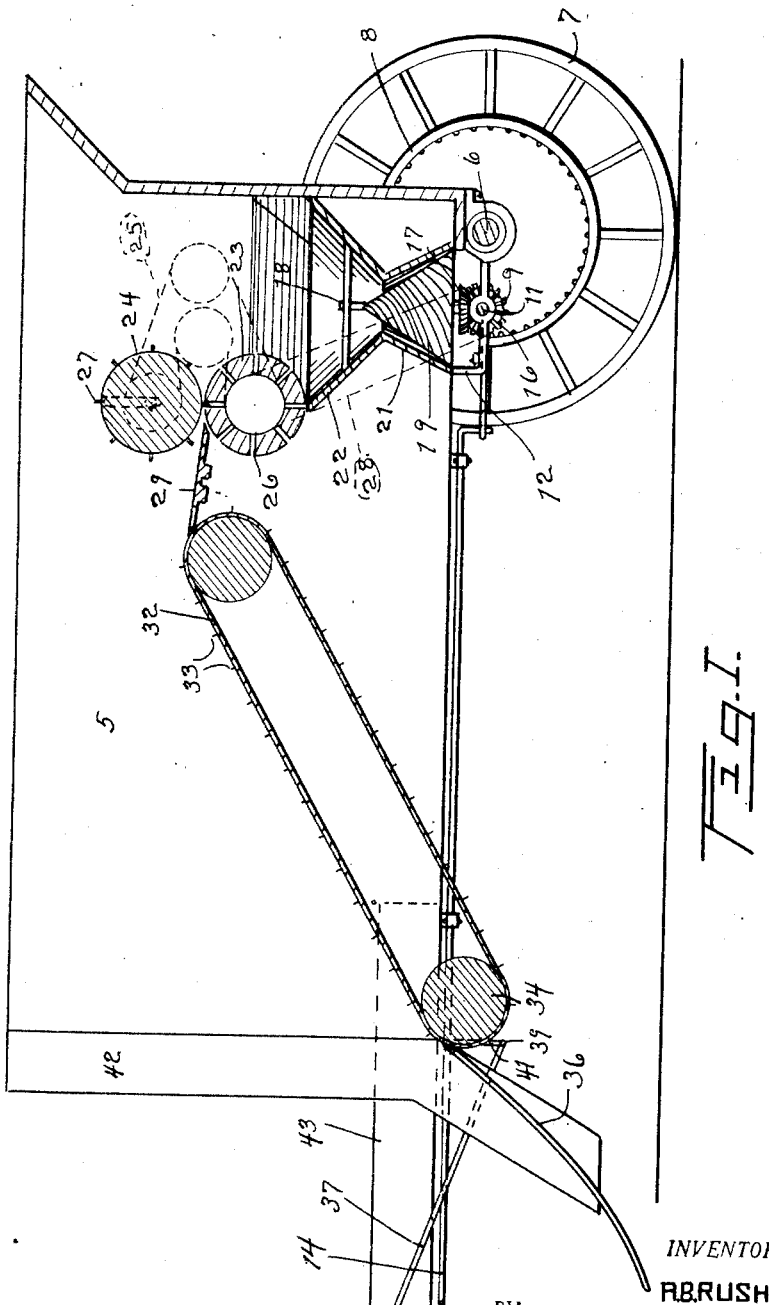

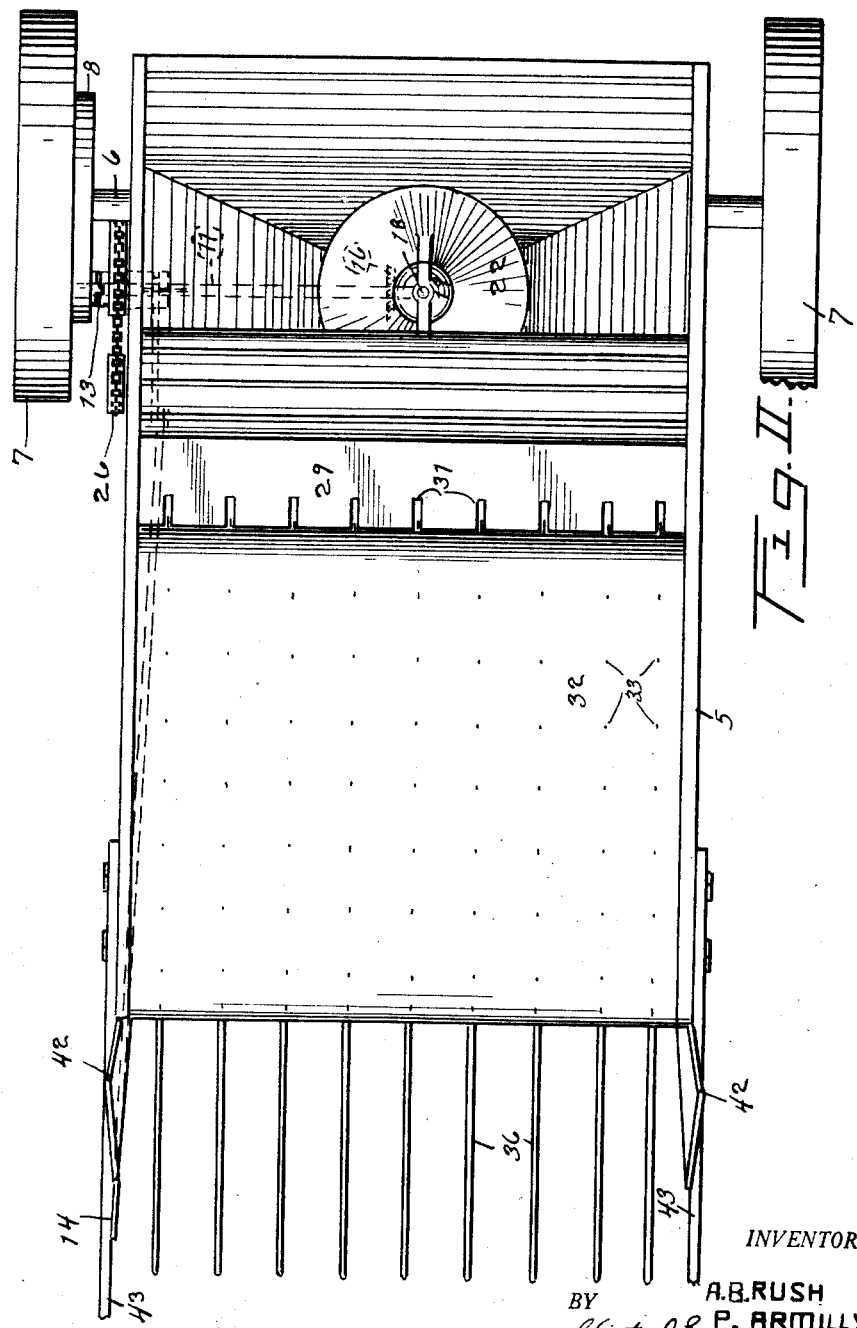

1,702,173

UNITED STATES PATENT OFFICE.

AVERY B. RUSH AND PETER ARMILLY, OF NEWCASTLE, CALIFORNIA.

MECHANISM FOR ELIMINATING BRUSH FROM ORCHARDS.

Application filed May 19, 1928. Serial No. 279,042.

This invention relates to improvements in mechanism for eliminating brush from orchards and the like places.

The principal object of this invention is to provide means whereby the brush or clippings from pruned trees may be gathered up, cut into short lengths and then ground up and redeposited upon the ground in such a manner that the same will quickly re-enter the ground as a fertilizer.

A further object is to produce a device which is economical to manufacture, and one which may be driven through the orchard without danger of injuring the same.

A still further object is to produce a device which is simple to manipulate and therefore one which may be operated by an unskilled laborer.

Other objects and advantages will be apparent during the course of the following description.

In the accompanying drawings forming a part of this specification and in which like numerals are employed to designate like parts, throughout the same, Figure 1 is a vertical cross section of my device, and Figure 2 is a top plan view thereof.

At the present time the trees in an orchard are trimmed or pruned and the sticks and branches therefrom fall to the ground, which branches must be gathered up, transported to a distant point and burned. This results in considerable labor, expense as well as as the time involved, which is a serious item due to the scarcity of labor.

Applicants have therefore devised a vehicle upon which certain mechanism is placed, which mechanism will gather up these branches or sticks lying upon the ground, deliver them to a conveyor, which conveyor in turn delivers them to cutting rolers, which cut the branches into short lengths after which they are delivered to a hopper from which hopper they are ground up and redeposited upon the ground in the form of chips or meal. This results in the disposal of the branches and at the same time it redeposits upon the ground, material which later enters the ground as it disintegrates thus enriching the soil.

In the accompanying drawings wherein for the purpose of illustration is shown a preferred embodiment of our invention, the numeral 5 designates the body of the vehicle having a rear axle 6 upon which wheels 7 are secured. One of these wheels carries an internal gear 8 which meshes with a gear 9. This gear is freely rotatable upon the end of a shaft 11 carried upon a frame 12. Mounted beneath the body 5 a clutch mechanism as shown at 13 serves to connect the gear 9 to the shaft 11 and functions in the usual manner. This clutch is of such construction that when the vehicle is moved rearwardly, the clutch will disengage thereby preventing operation of the mechanism mounted upon the vehicle. This clutch is controlled by a clutch rod 14 which extends to a point adjacent the driver's seat.

The shaft 11 carries a bevel gear 16 which meshes with a bevel gear 17 mounted upon a vertical shaft 18. This shaft 18 carries a grinding rotor 19 centrally positioned within the grinding drum 21. A hopper is shown at 22, which hopper is adapted to receive material deposited therein from the cutting rollers 23 and 24. The roller 23 is constructed with slots 26 into which the knives 27 mounted upon the roller 24 are adapted to pass. These cutting rollers 23 and 24 are driven in unison by a chain 25 which is so reeved that the roller 24 may have vertical movement with respect to the roller 23 so as to accommodate for branches of different thickness. A chain 28 serves to transmit power from the shaft 11 to the roller 23.

At 29 we have shown a takeoff board having slots 31 formed therein, which takeoff board has its forward end adjacent the upper surface of the conveyor belt 32. This conveyor belt has pins 33 formed upon its surface, which pins are adapted to pass through the slots 31. The lower end of the conveyor is reeved over a roller 34. A plurality of rake teeth are pivotally secured at a point in front of the roller 34. These teeth are designated by the numeral 36. They may be raised by a pole rod 37 which is pivotally connected as at 39 to a downward extending bar 41, which bar is secured to the pivotal point of the teeth 36. Fenders are shown at 42, which fenders serve to lead the brush or branches into the vehicle body. Drawbars are shown at 43, which drawbars may be connected to any form of traction.

It will thus be seen that when our vehicle is moved over the ground, any brush upon the ground will be engaged by the forks 36 and elevated to the conveyor 32 where it will become engaged by the pins 33 and finally delivered to the takeoff plate 29. From this point it will pass between the rollers 23 and 24 where it will be cut into small pieces and delivered to the hopper 22 thence to the grinder where it is ground up and redeposited upon the ground.

It will thus be seen that we have produced a device which will accomplish all the objects above set forth.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:—

In a device of the character described, a body, a plurality of rake teeth pivotally secured to said body, an inclined conveyor mounted in said body, and adapted to receive material from said rake, a pair of cutting rollers mounted adjacent the opposite end of said conveyor, a takeoff plate positioned between said conveyor and said rollers, means for driving said cutting rollers, a hopper positioned beneath said cutting rollers, a grinding element positioned beneath said hopper and adapted to receive material therefrom and means for driving said grinding element.

In testimony whereof we affix our signatures.

AVERY B. RUSH.
PETER ARMILLY.